United States Patent
Minks

[11] 3,789,688
[45] Feb. 5, 1974

[54] INTERRELATED SHIFT, STARTER AND CLUTCH CONTROLS

[76] Inventor: Floyd M. Minks, Rt. 1, Box 41, Kissimmee, Fla. 32741

[22] Filed: Jan. 18, 1971

[21] Appl. No.: 107,050

[52] U.S. Cl......................... 74/365, 74/335, 74/850, 192/3.56, 192/51, 192/142 R, 200/47
[51] Int. Cl... B60k 29/00, B60k 23/02, B60k 23/04
[58] Field of Search..... 74/335, 365, 356, 355, 378; 192/48.2, 51, 84 R, 142 R

[56] References Cited
UNITED STATES PATENTS

| | | | |
|---|---|---|---|
| 2,248,564 | 7/1941 | Wood............................. | 192/142 R |
| 2,688,718 | 9/1954 | Hoffar............................ | 74/365 X |
| 3,130,596 | 4/1964 | Gorski........................... | 74/365 |
| 3,161,075 | 12/1964 | Horning et al................. | 74/365 X |
| 3,224,291 | 12/1965 | Zimmerman.................. | 74/365 X |

Primary Examiner—Benjamin W. Wyche
Attorney, Agent, or Firm—Andrus, Sceales, Starke & Sawall

[57] ABSTRACT

A marine engine is coupled to a propeller by a clutch unit and a shift unit. A d.c. permanent magnet motor is coupled to the shift unit and the clutch unit. The motor is energized in a servo loop to selectively establish a forward drive, a reverse drive, or a neutral shift position. The motor is connected to the power supply through a pair of relays to ground both sides and to selectively connect one side to the power supply. A forward relay line is opened by a motor operated cam switch responsive to a full shift position. The reverse relay line is similarly controlled. A neutral line is connected to both of the cam switches and includes a similar cam switch which is actuated in the neutral position.

A three-position selection switch connects power to the several relay lines and the neutral line. An electronic interlock circuit interconnects the neutral line to the forward and reverse relay lines.

15 Claims, 9 Drawing Figures

Patented Feb. 5, 1974
3,789,688
4 Sheets-Sheet 1
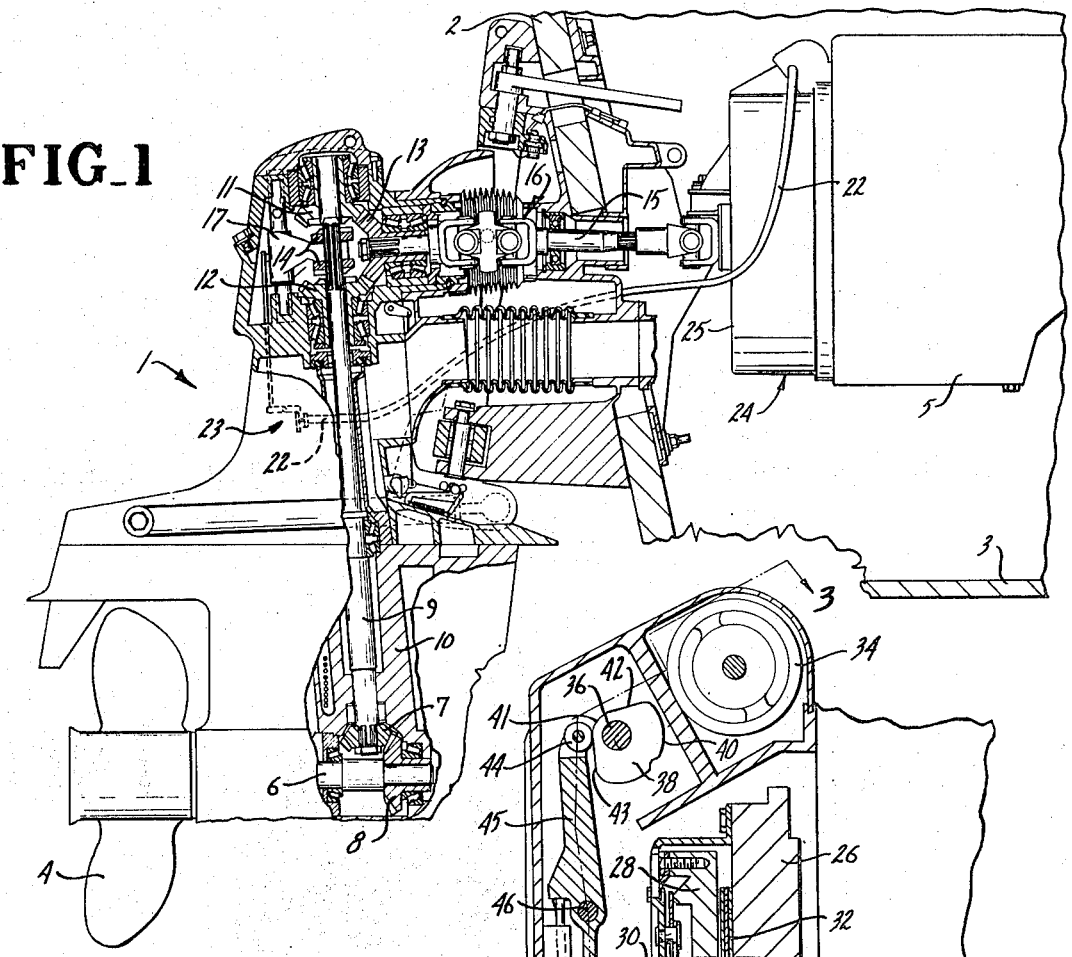
FIG_1
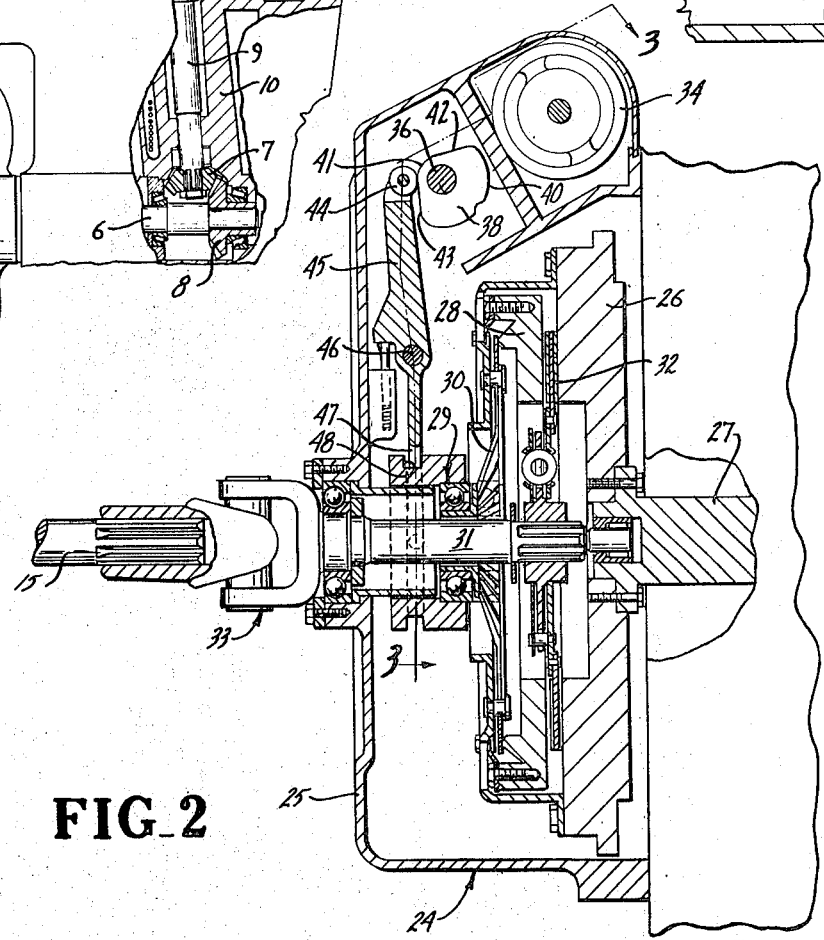
FIG_2
INVENTOR.
FLOYD M. MINKS
BY
Attorneys Patented Feb. 5, 1974

INVENTOR.
FLOYD M. MINKS
BY
Attorneys

Patented Feb. 5, 1974

INVENTOR.
FLOYD M. MINKS
BY
Attorneys

Patented Feb. 5, 1974

INVENTOR.
FLOYD M. MINKS
BY
*Andrus, Sceales, Starke & Sawall*
Attorneys

INTERRELATED SHIFT, STARTER AND CLUTCH CONTROLS

BACKGROUND OF INVENTION

This invention relates to a multiple position drive control apparatus and particularly to a power actuating means for driving of an automatic engine-drive clutch and shift mechanism such as may be employed in a stern drive unit for a marine propulsion system and the like.

In the development of marine drive systems, inboard-outboard systems have substantial advantages from economic and operating considerations. For example, U.S. Pat. No. 3,399,647 which issued Sept. 3, 1968, discloses an engine driven marine propulsion unit for watercraft and the like of an inboard-outboard drive construction, and in particular discloses an actuating means for actuating the forward and reverse shift mechanisms in synchronism with the clutch such that the shifting is done only when the drive system has been effectively disconnected. In that system, the actual shift mechanism is interconnected through the throttle control to provide a mechanical linkage interconnected to the shift mechanism for mechanically shifting. The clutch is actuated through a hydraulic system having the input control interconnected or coupled to the throttle and shift control. Although such shift control systems have been found to provide satisfactory and distinctly advantageous operation, they have not been practically widely employed in commercial devices because of the initial cost and maintenance requirements.

The present invention is particularly directed to an automatic multiple position control which, in combination with the necessary shift and clutch elements, provides a highly satisfactory and novel automatic power driven shift and clutch control means.

SUMMARY OF THE INVENTION

Generally in accordance with the present invention, a prime mover, such as an electric motor, is coupled to actuate a load means, such as the shift means and/or the clutch means, for an internal-combustion engine drive apparatus. The motor is connected into a positioning or energizing circuit means and energized through a servo-type drive to selectively establish a full forward drive condition, a full reverse drive condition, or an intermediate neutral condition with respect to the drive apparatus. The energizing circuit means for the prime mover includes a first and a second circuit control means for selectively energizing the motor to establish a forward drive condition and alternately a reverse drive condition. A neutral circuit means is connected through the first and second circuit means to energize the prime mover to establish and hold a neutral condition.

In a highly novel and satisfactory construction applied to a stern drive marine propulsion unit, a reversible electric motor of a D.C. permanent magnet construction is connected to the power supply through a pair of electrically responsive switching means connected to the opposite sides thereof and each having two alternate circuit connections or positions. In the first switch position of a switch means, the corresponding side of the motor is connected to one side of the power supply and in the alternate switch position, the corresponding side is connected to the opposite side of the power supply; for example, ground. Thus, by having the switch means oppositely positioned, the motor is interconnected for selective directional energization and operation. The two electrically responsive switching means are interconnected for operation through a forward drive energizing line and a reverse drive energizing line. Each of the lines further includes a related disconnect switch means responsive to a full shift position to open the corresponding energizing line and thereby reset the switch means to its normal position. A neutral line is interconnected to both of the directional drive lines and in particular through the related directional disconnect switch means. The interconnection of the neutral line includes suitable unidirectional conducting means to permit conduction from the neutral line to each of the drive lines while maintaining the drive lines essentially isolated and independent of each other. Additionally, the neutral line includes a disconnect switch which is actuated in response to the movement of the motor to the neutral position.

In a preferred construction for a clutch drive and shift system for an inboard-outboard stern drive unit, such as shown in the previously referred to U.S. Pat. No. 3,399,647, a reversible permanent magnet motor is interconnected to drive a control cam and control unit which included suitable couplings interconnected to the shift mechanism and to the clutch mechanism for sequential operation thereof. The control unit includes a cam shaft and also includes switch control cams for proper timed operation of the several disconnect switches in response to a predetermined angular rotation and orientation of the cam shaft in moving between full shift positions.

In one embodiment, a three-position selection switch means connects power to the several directional drive lines and the neutral line, which in turn are connected to energize a pair of relays which function as the switching means. The relay includes two sets of contacts, one of which normally connects the motor to ground and the opposite of which, when the relay is energized, connects the corresponding side of the motor to the positive or ungrounded side of the power supply. The permanent magnet motor is such that grounding of both sides of the motor causes the motor to stop very rapidly and to lock itself into a stopped position. The relays are connected to the drive lines which include the normally closed disconnect switches and which are interconnected to the incoming power by an appropriate three-position selection switch. The neutral line is interconnected through its disconnect switch and a pair of diodes to both of the directional control lines. The disconnect switches are controlled by suitable movement of the cam shaft.

The electrically actuated switch means may be completely separate in individual relays or, in accordance with the further novel aspect of the present invention, may be incorporated with a common ground return. In the latter construction, the relays are constructed with a common pivoted armature. The energizing of one relay causes the armature to pivot, decreasing the air gap with respect to the energized relay and increasing the air gap with respect to the other relay. The electromagnetic force required to move the armature varies inversely with the square of the distance between the armature and the coil. Consequently, if a relay is energized to attract the armature, the subsequent energization of the other relay, while the first relay is energized, will not change the circuit connection. The use of this special relay positively prevents the possibility of simultaneous energization of both relays and minimizes the initial cost of the control system. The selection switch can be a completely separate control element or may be interlocked and interconnected to a single lever control, for example, as shown in U.S. Pat. No. 3,399,647.

In accordance with a further novel aspect of this invention, a neutral lock-out circuit may be provided to positively prevent the integrated relay unit from locking up. A sensing means is provided to establish a neutral drive circuit, including the neutral disconnect switch means. The sensing means is preferably a static solid state switch means defining an "or" gate connected to the power supply and to the selection switch means such that the latter biases the sensing means to cutoff when either in forward or reverse position.

The present invention may also conveniently include a single lever type control wherein the shift control is incorporated in the throttle control. In a particularly novel construction, the throttle control includes a pivotally mounted member to which the throttle cable is centrally connected such that rotation to either side of a neutral position correspondingly moves the cable. The shift switches are magnetically actuated switches mounted to the opposite sides of the pivot point of the member. A pair of actuators are secured to the member in spaced relation to the corresponding switches in the neutral position. Pivotal movement of the member aligns an appropriate actuator and switch to establish the desired shift.

BRIEF DESCRIPTION OF DRAWINGS

The drawings furnished herewith illustrate the best mode presently contemplated by the inventor for carrying out the subject invention and discloses the above advantages and features as well as others which will be readily understood from the following description.

In the drawings:

FIG. 1 is an enlarged partial side elevational view of an inboard-outboard drive interconnected to a boat with parts broken away in section to show the drive arrangement including the reversing gear means;

FIG. 2 is an enlarged sectional view showing a friction clutch means and an actuator means therefor constructed in accordance with the teaching of the present invention;

DESCRIPTION OF THE ILLUSTRATED EMBODIMENT 20

Figure 3:
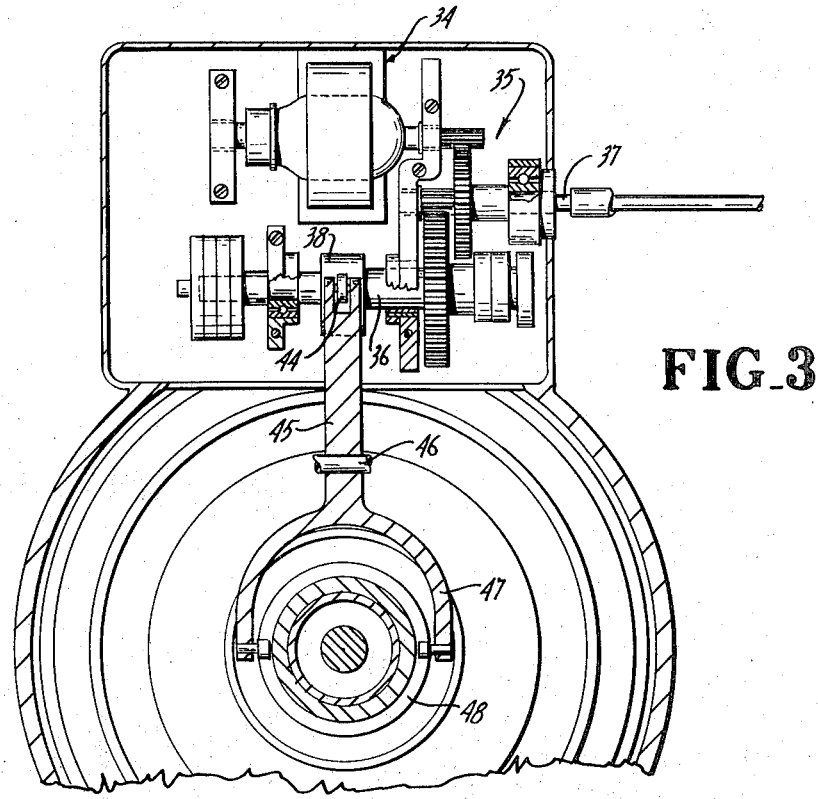
FIG. 3 is a view taken generally on line 3—3 to show construction of a motor and cam arrangement forming a part of the illustrated embodiment of the present invention.

Referring to the drawings and particularly to FIGS. 1 and 2, the present invention is shown applied to a marine propulsion device of an inboard-outboard stern drive construction similar to that shown in the previously referred to U.S. Pat. No. 3,399,647.

Generally, in the illustrated embodiment of the invention, a stern drive unit 1 is pendantly and dirigibly suspended outboard from the transom 2 of a partially shown boat or other watercraft 3. The drive unit includes a propeller 4 which is driven by the partially shown engine 5 mounted inboard of the boat.

The propeller 4 in the illustrated embodiment is a righthand propeller providing forward propulsion with rotation to the right and is carried by the generally horizontal propeller shaft 6 which is driven through gears 7 and 8 by the generally vertical shaft 9 rotatably supported within housing 10 of the drive unit. A pair of vertically spaced beveled reversing gears 11 and 12, of which the upper gear 11 is the forward gear and the other the reverse gear, are mounted in suitable bearings and are freely rotatable on the upper end of shaft 9. The drive gear 13, the axis of which is disposed generally horizontal, drivingly engages the beveled gears 11 and 12 and causes the latter gears to rotate in opposed directions. A shift element 14, disposed between gears 11 and 12, is carried by shaft 9 and is slidable axially of the shaft to selectively engage gears 11 and 12 to complete the drive connection between the drive gear 13 and the vertical shaft 9. Shift element 14 also has an intermediate neutral position between gears 11 and 12 in which position of the element the shaft 9 and propeller 4 are inoperative, as shown in FIG. 1.

The drive gear 13 is driven by engine 5 through the generally horizontal drive shaft 15 which is interrupted by the double universal joint 16. Universal joint 16 is disposed generally with the center thereof at the intersection of the generally transverse vertical and horizontal planes respectively containing the swivel and tilt axes of the propulsion unit 1 so that the drive through joint 16 will remain intact during steering and tilt movements of the propulsion unit.

Element 14 is selectively actuated or shifted into gear engagement by the shifter fork 17 movable generally vertically within housing 10. For forward drive operation the shifter fork 17 carries the shift element 14 upwardly so that the circumferentially spaced ratchet teeth engage gear 11 to drive the propeller 4. Reverse drive operation is effected when the shifter fork 17 moves shift element 14 downwardly to engage circumferentially spaced ratchet teeth on the element with the gear 12.

Movement of the element 14 and shifter fork 17 is effected through actuating means including a rotating cable 22 operated from a remote location in the watercraft. The cable 22 may enter the propulsion unit housing 10 beneath the horizontal drive shaft 15 and is interconnected through a suitable shift linkage 23 to selectively position the shifter fork 17 between an intermediate neutral position, a raised forward drive position or a lowered reverse drive position or condition. As in U.S. Pat. No. 3,399,647, a clutch assembly 24 is interposed between the engine 5 and the drive unit 1 to operatively disconnect the drive therebetween prior to the shifting of the gear element 14 into or out of driving engagement such that essentially very minimal or no torque is being transmitted to the drive unit during the transfer.

As shown in FIG. 2, the assembly 24 includes an outer covering or housing 25 which is secured to the engine 5 and extends outwardly to enclose the clutch mechanism and the other operating components, as follows. A flywheel 26 is carried within the housing 25 on the outer end of the engine shaft 27. The clutch assembly 24 includes a pressure plate 28 secured to the throwout bearing 29 through a suitable biasing spring 30. The bearing is slidably mounted about a drive shaft 31 which in turn carries at its innermost end a driven disk 32 which extends radially outwardly between the pressure plate 28 and the flywheel 26 generally, as disclosed and more fully described in U.S. Pat. No. 3,399,647. The drive shaft 31 is coupled through a suitable coupling 33 to the shaft 15. Thus when the pressure plate 28 is urged toward the flywheel to effect a clamping of the disk 32, the rotation of the shaft 27 and flywheel 26 is transmitted to the shaft 15.

The present invention is particularly directed to an improved automatic power driven means for controlling the clutching and shifting means, such as shown in FIGS. 1 and 2. In the illustrated embodiment of the invention, the positioning of the shaft cable 22 and the throwout bearing 29 are actuated in properly timed sequence to provide the desired sequential operation.

Figure 4:
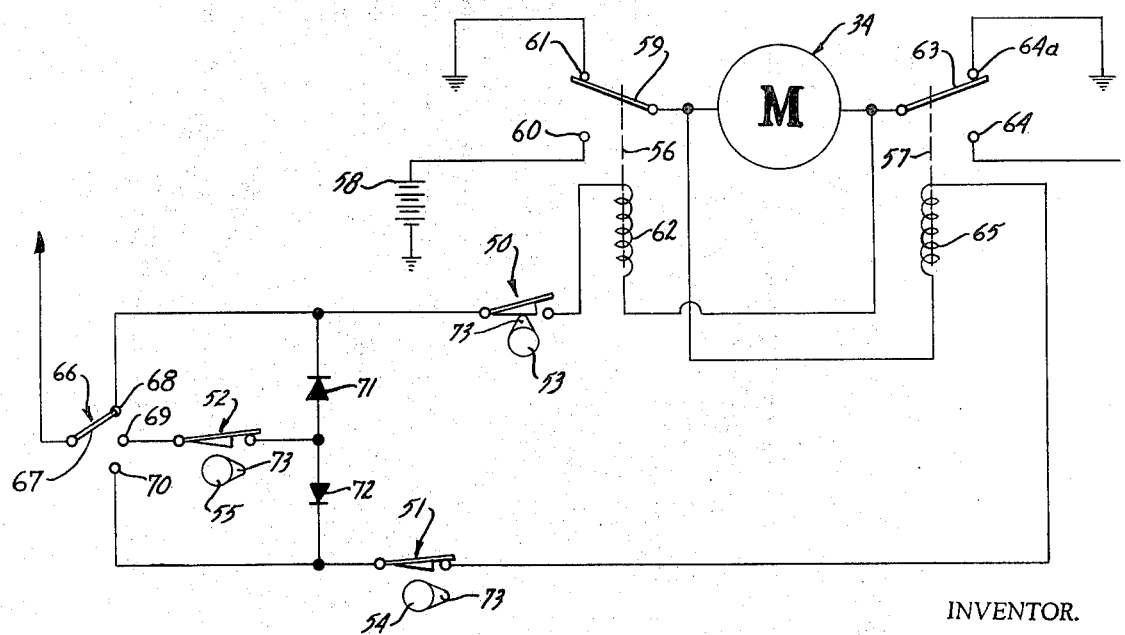
FIG. 4 is a schematic circuit diagram showing one embodiment of the present invention.

Referring particularly to FIGS. 3 and 4, the illustrated embodiment of the invention is an electrically actuated system having a shift control motor 34 mounted adjacent the housing 25 and coupled through a suitable gear reduction means 35 to drive a cam shaft 36 and a gear shift shaft 37.

The illustration of the invention, as shown in FIG. 3, is to clearly illustrate one embodiment of the present invention. The particular construction and arrangement of the motor gears and cams or the like, as presently described, may, of course, be made in accordance with space and other design considerations required.

In the illustrated embodiment, the gear shift shaft 37 is coupled to the flexible cable 22 to rotate the cable and linkage 23 in accordance with the drive of the motor 34 and to thereby position the shift mechanism 14 in neutral, reverse drive, or the forward drive position.

Generally, the cam shaft 36 carries a clutch cam 38, shown in FIGS. 2, 3 and 4, which is positioned and shaped to provide selected sequential movement of the clutch pressure plate 28 in timed relation to the movement of the dog clutch element 14. On portion of cam 38 is formed as a small radius portion 40 connected by a pair of adjacent linear arc portions 41 and 42 to a large radius portion 43 of a constant and greater radius upon which a cam follower 44 rides. Each forward or reverse 270 degree rotation of the cam 38 moves and positions the roller follower 44 which is carried on the outer end of a clutch fork 45, the opposite end of which is coupled to the throwout bearing 29. A pivot pin 46 pivotally supports the fork 45 for pivotal movement on an axis normal to the axis of the throwout bearing 29 such that pivoting of the fork 45 causes the lower end to move axially of the shaft 31 and the throwout bearing 29. The lower end of the fork 45 is bifurcated as at 47 and extends about and mates with a groove 48 in the outer periphery of the throwout bearing 29. The bearing 29 is thereby allowed to rotate while maintaining the coupling to the clutch fork 45. The spring loading of the pressure plate provides a biasing force on the throwout bearing 29, holding the follower 44 riding on the surface of the cam 38.

The cam 38 generally has a periphery with the minimum radius clutch engaged portion 40 and the large radius clutch disengage portion 43.

In an actual construction, the cam construction was selected with an included angle of essentially 270° between the opposite points of the engaged radius portion and with the clutch disengage portion 43 centrally of such angle. The cam shaft 36 is coupled to motor 34 through the gear reduction means 35 to rotate cam 38 in synchronism with the movement of the shift shaft 37. As the cam 38 rotates through approximately 45°, the follower 44 rapidly moves outwardly to a large constant radius portion, causing the cam follower to move outwardly to the larger radius portions to initiate declutching and permit the shift mechanism to move to drive engagement under minimal or no loading, followed by movement into the opposite clutch position. Reverse movement or rotation result in a movement into the large radius portion 42 to declutch subsequent shift of the gears to neutral, and then again establish the fuel line clutch position. Generally, during the shift movement, the clutch mechanism is thereby generally held disengaged to minimize the torque and load on the gear system.

The movement of the motor 34 is controlled by a plurality of cam actuated switches including a forward drive control switch 50, a reverse drive control switch 51, and a neutral control switch 52, all of which are mounted and axially spaced adjacent to the cam shaft 36. The switches are connected in a drive or energizing circuit for the motor 34, as shown in FIG. 4. Related cams 53 through 55, respectively, are secured to the shaft 36 and rotate therewith. The peripheries of cams 53–55 are specially formed to provide the desired operation of the motor 34 between full forward and reverse positions as well as intermediate neutral position.

Referring particularly to FIG. 4, the motor 34 shown as a direct current permanent magnet motor adapted to be energized from the battery 58 for the marine unit. A forward drive relay 56 and a reverse drive relay 57 selectively interconnect the opposite sides of the motor to the circuit of the battery 58.

The forward drive relay 56 includes a common arm or contact 59 connected directly to one side of the motor 34. Arm 59 selectively engages a power contact 60 and a ground contact 61. The power contact 60 is connected to the positive side of the battery 58. The ground contact 61 is connected to a suitable ground, as schematically shown. A relay winding 62 is interconnected to the battery through the forward drive switch 50, as hereinafter described, to selectively control the positioning of the contact arm 59. The structure is such that the contact 59 engages the ground contact 61 in the de-energized relay state. When the relay winding 62 is energized, the contact 59 disengages contact 61 and moves into engagement with power contact 60 to connect the positive side of the battery 58 to the motor 34.

Reverse drive relay 57 is similarly constructed and includes a common contact 63 connected to the opposite side of the motor 34 and selectively engages a power contact 64 connected to the battery and a ground contact 64a connected to a suitable ground. The relay 57 similarly includes a relay winding 65 interconnected to the battery 1 through the reverse drive switch 51. The relay 57 also, when in a de-energized state, has common contact arm 63 engaging the ground contact 64a. When both of the relays 56 and 57 are de-energized, both sides of the motor 34 are grounded and, as well known, a permanent D.C. magnet motor will rapidly stop and hold the position.

Referring particularly to FIG. 4, the positioning of the drive mechanism is controlled by a three-position control or selection switch 66 interconnected to selectively connect power to the relay windings 62 and 65. The switch 66 includes a common contact arm 67 to the positive side of the battery 58, and selectively engages a forward drive contact 68, an intermediate positioned neutral contact 69, and a reverse contact 70.

The relay winding 62 of the forward drive relay 56 is connected in series with the normally closed cam operated switch 50 to the contact 68. The opposite side of the relay winding is selectively interconnected to ground in common with the one side of the motor via the contact arm 63 of the reverse drive relay 57. With the selection switch contact arm 67 positioned to engage the forward contact 68, power is supplied to the relay winding 62 as long as switch 50 is closed. However, as the mechanism moves to the full shift position as a result of the energization of the motor 34 and the rotation of the shift cam, the switch cams 53 through 55 also rotate. The forward drive cam 53 is configured such that the forward drive rotation of the motor 34 and shaft 36 causes the cam 53 to open the switch 50 and thereby open the power circuit to the forward drive relay 56 in synchronism to full forward shift. As a result, the relay 56 releases its contact, which moves to engage the ground contact 61. At the full forward drive rotation, both sides of the motor are again grounded and the motor 34 rapidly halts, with a positive holding of the motor 34 and cam mechanism in the driven position.

The reverse drive relay winding 65 is similarly interconnected to the power supply through the associated cam operated switch 51 to the reverse drive contact 70 of the selection switch 66. The opposite side of the relay winding 65 is connected to the forward drive side of the motor 34 and through the ground contact arm 59 and contact 61 of the forward drive relay 56 to ground. If the three-position switch 66 is positioned to effect engagement of contact arm 67 and reverse drive contact 70, the relay winding 65 is energized to cause a reverse rotation of the motor 34 with a reverse movement of the cam mechanism. This effects the desired declutching and shifting The rotation of the cams 53-55 establish the reclosing of the forward drive contact 50 and after full reverse drive engagement is established, the reverse drive cam 54 opens the switch 51 to terminate the energization and again connect both sides of the motor 34 to ground. The motor 34 will then rapidly stop and hold the drive in the reverse position.

Additionally, the neutral contact 69 of the switch 66 is interconnected to both the forward drive relay circuitry and the reverse drive relay circuitry just described through suitable diodes 71 and 72. Thus, one side of the neutral switch 52 is connected to the switch contact 69 and the opposite side is connected to the corresponding anodes of diodes 71 and 72. The cathode of diode 71 is connected to the common junction of the forward contact 68 of switch 66 and the common side of the disconnect or forward drive control switch 50. The cathode of the diode 72 is similarly connected to the junction of the contact 70 of switch 66 and disconnect or reverse drive control switch 51. Thus, during the rotation of the cam shaft, the neutral switch 52 is offset with respect to the opposite cams to maintain the switch normally closed, but to open the switch 52 as the unit moves to the neutral position.

Each of the switch cams 53-55 includes a switch-open projection 73 of a relatively large radius. The switch cams are offset or angularly oriented with respect to each other to effect the desired opening of the respective switches 50 through 52 with the mechanism in the desired forward, reverse or neutral position.

In the illustrated circuitry, the selection switch 66 is shown in the forward drive position and the associated disconnect switch 50 is in the opened position. This then assumes that the system is driven to the full forward drive state or condition. If the selection switch is moved to the reverse drive contact 70, the reverse drive relay 57 will be energized, as previously noted, and the motor 34 will operate to reverse the position of the gear shift mechanism.

During the reverse drive, the forward disconnect switch cam 53 releases the disconnect switch 50 which closes, and the one side of the forward drive relay 62 is again connected to power. However, the opposite side of the relay is connected to a corresponding potential as a result of the previous energization of the reverse drive relay 57.

If the selection switch 66 is moved to engage the neutral contact 69, power is now supplied through the normally closed neutral disconnect switch 52, the diode 72, the normally closed reverse disconnect switch 51, the reverse drive relay winding 65, and the ground contact 61 of the forward drive relay 56. The motor 34 will drive in a reverse direction; first disengaging the clutch mechanism, disengaging the shift mechanism and moving to the neutral position. When the neutral position is reached, the neutral disconnect switch 52 opens and removes power. Thus, by positioning of the selection switch 66, the motor is positioned in any one of the three desired connections.

Figure 5:
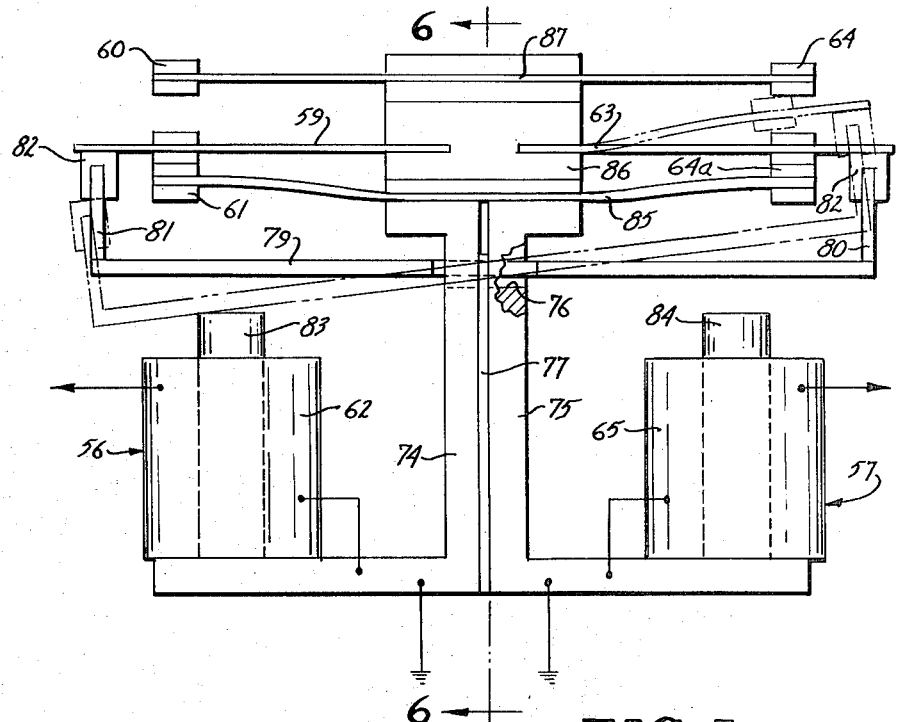
FIG. 5 is a side elevational view of a single ended double relay unit for use in the control circuit such as shown in FIG. 4.
Figure 6:
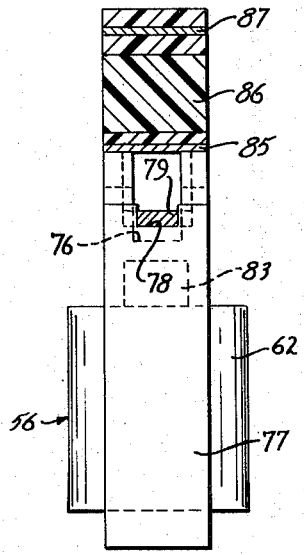
FIG. 6 is a view taken generally one line 6—6 of FIG. 5.

In the illustrated embodiment of the invention of FIG. 4, relay switching means are interconnected into the circuit through the contact of the opposite relay means to essentially prevent the simultaneous energization of the relays. However, if desired, other interlocking means can be provided and a highly satisfactory and novel construction of a relay employing a common ground is shown in FIGS. 5 and 6.

In the illustrated construction of a single ended dual relay unit, a pair of L-shaped mounting bases 74 and 75 are arranged with abutting generally adjacent leg portions, with the opposite legs extending outwardly in an opposite direction to define a mounting base.

The upper end of the L-shaped mounting bases 74 and 75 are slotted as at 76 to define an intermediate armature receiving slot. A spacing plate 77 is disposed between the adjacent legs of the L-shaped bases. Plate 77 is formed of a silicon rubber or the like and notched as at 78 to define a knife edge projecting upwardly, slightly above the bottom of the slots 76 in the bases 74 and 75, as shown most clearly in FIG. 6. A plate-like armature 79 rests on the knife edge 78 and is provided with edge slots mated with the adjacent portion of the bases 74 and 75 and plate 77 to permit restricted and guidance pivotal movement of the armature 79, as shown in FIG. 5. The armature 79 extends outwardly to the opposite sides parallel to and over the corresponding base leg portions of the bases 74 and 75. The outermost ends of the armature plate are reduced to operating pin-like portions which are bent upwardly as at 80 and 81 and covered with suitable insulators 83. The armature 79 is generally a more or less balanced member which is selectively positioned by a pair of magnetic pole units 83 and 84 provided to the opposite sides in alignment with the opposite ends of the armature. The pole units are secured to the outer portion of the L-shaped bases 74 and 75, and each includes one of the windings 62 and 65 respectively. The relay winding 62 is shown on the pole 83 to the left side in FIG. 5, and the relay winding 65 is wound on the magnetic pole 84, as shown to the right in FIG. 5.

The energization of the relay winding 62 will attract the armature 79 and close the gap between the armature and the magnetic pole 83. Simultaneously, the opposite end of the armature 79 pivots away from the pole 84 and thereby increases the air gap. Thus, once the pole 83 attracts the armature 79, the energization of the opposite relay winding 65 will not be able to move the armature because of the increased air ap. The magnetic force varies inversely with the square of the distance between the armature 79 and the respective poles 83 and 84. Consequently, the force of the second winding is essentially very small compared to the holding force that is effected by the previously energized relay winding.

The contacts of the unit are controlled by the pivoting of the armature as follows. The base members 74 and 75 may be grounded with the ground ends of the coils connected directly thereto. The contacts for operating the motor 34 may correspond to those of FIG. 4 and correspondingly numbered in FIG. 1, wherein the contacts are secured to the upper ends of the bases which may be provided with oppositely extending flanges defining a mounting surface.

A common contact member 85 is secured directly to the mounting bases 74 and 75 and forms the ground contacts 61 and 64a of the respective relays, as a result of the grounding of the base members 74 and 75. A suitable clamping and insulating member 86 is secured overlying the central portion of a common contact member 85, with individual leaf spring arms embedded therein defining the contact arms 59 and 63 of FIG. 4. The intermediate leaf spring or contact arms 59 and 63 each includes a contact portion aligned with the ground contacts 61 and 64a secured to the common contact member 85. The leaf spring contacts 59 and 63 extend outwardly therefrom with the outer ends over the insulators 82 of the respective armature projections 81 and 82.

The drive contacts 60 and 64 are secured to the outer ends of a common contact member 87 and engaged by the contact arms 59 and 63 as a result of the pivotal movement of the armature 79. With the armature 79 in the balance position, the contact arms 59 and 63 engage the common contacts 61 and 64a and provide a ground connection to the opposite side of the motor 34. The pivotal movement of armature 79 to engage the reverse drive contact 64, for example, results in a release of the common contact 61 of the opposite drive relay, which then maintains the ground connection to the common contact leaf spring 85.

In the operation of the relay, as applied to the circuit of FIG. 4, the energization and de-energization of the respective relays is the same as that previously described. However, in this instance the release of the opened disconnect switch 50 or 51 corresponding to the forward or reverse drive line as a result of reversing the desired shift position, results in a re-energization of relay 56 or 57. Both relays are now energized. However, the force of the re-energized relay is insufficient to change the position of the pivoted armature and the associated contacts and consequently the system operates in the same basic manner as that described with respect to FIG. 4.

Although the cam operated disconnect switches have been shown as mechanically actuated switches, any other suitable system can similarly be employed. For example, a permanent magnet operator can be interconnected to the cam shaft with a plurality of circumferentially displaced reed switches provided for selective operation of the several circuits.

Figure 7:
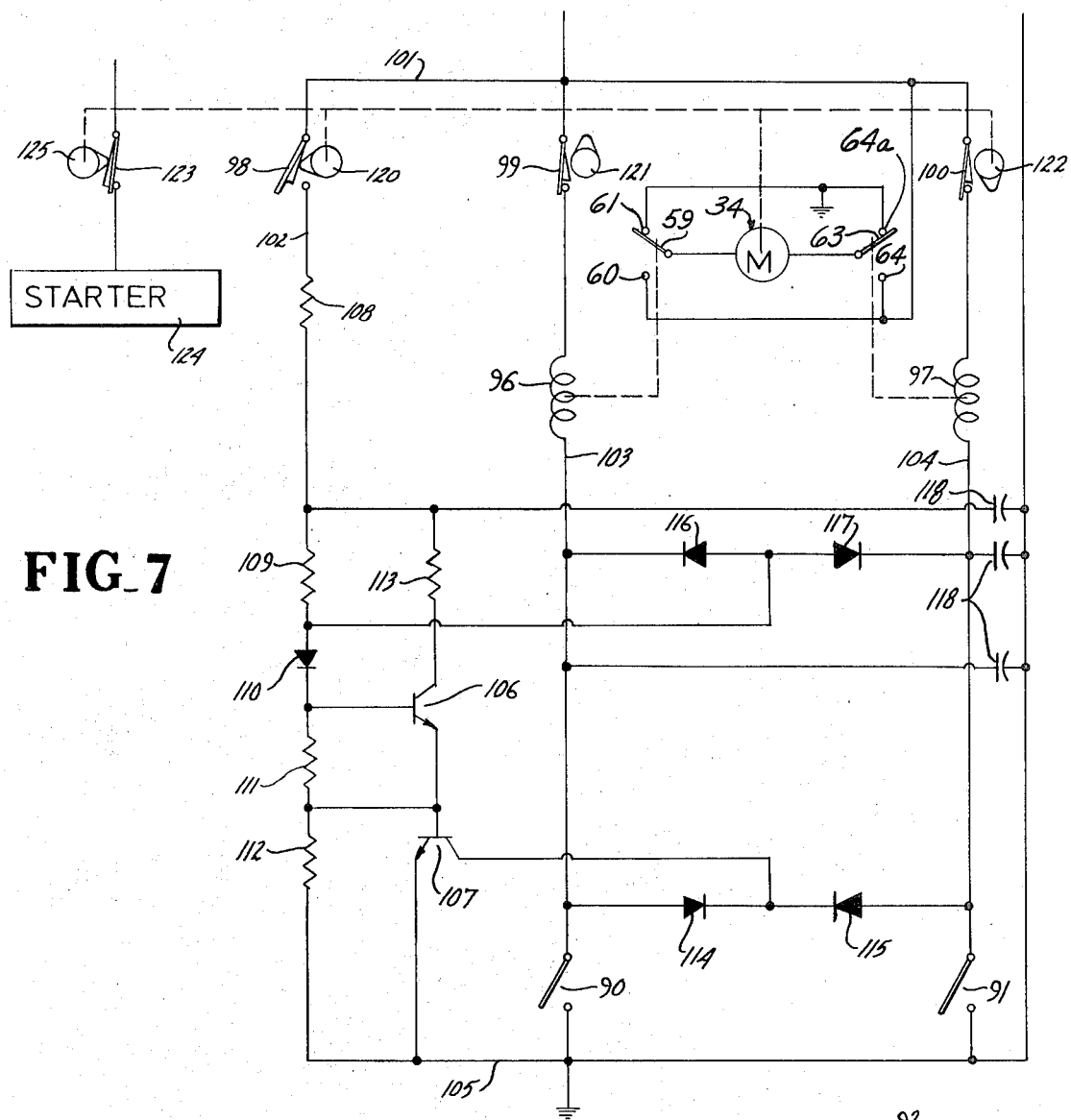
FIG. 7 is a schematic circuit showing an alternate construction for controlling the forward and reverse drive.
Figure 8:
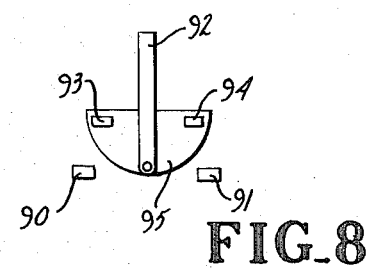
FIG. 8 diagrammatically illustrates a shift control lever mounting; and c8

Although the simple switching circuit shown may be employed, a highly advantageous neutral blockout circuit is preferably employed, such as shown in FIG. 7. In the illustrated embodiment of FIG. 7, the manually actuated selection switch includes a pair of reed switches 90 and 91 for selectively and operably establishing a forward drive circuit and a reverse drive circuit. The switches may advantageously be mounted, for example, as shown in FIG. 8. A shift lever 92 is pivotally mounted on a suitable shaft for forward and reverse rotation from a neutral upright position. The reed switches 90 and 91 are correspondingly mounted to the opposite sides of the lever 92. A pair of magnets 93 and 94 are correspondingly fixed to an operating plate 95 coupled to the shift lever shaft for corresponding movement. The magnets 93 and 94 are selectively aligned with the reed switches 90 and 91 as a result of the forward or reverse movement.

The reed switches 90 and 91 are connected to selectively control energization of relay windings 96 and 97 of the integrated relay, such as shown in FIG. 5, or completely separate relays as shown. The relay windings 96 and 97 similarly interconnect the permanent D.C. motor 34 to the battery power supply through the joint action of the reed switches 90 and 91, and a set of three switch means 98, 99 and 100, respectively related to a neutral control position, a forward drive control position or switch, and a reverse drive control switch.

The three switches 98, 99 and 100 are shown as camoperated switches which are closed except with the motor 34 positioned in the corresponding related position, when the corresponding switch is open. The three switches have one side connected to a common line 101 to the positive side of the battery. The opposite side of the switches 98, 99 and 100 are connected respectively to provide a power supply to a neutral branch circuit 102, a forward drive branch circuit 103 including winding 96, and a reverse drive branch circuit 104 including winding 97, similar to that previously described. The opposite sides of the coils 96 and 97 are connected directly to a ground or common line 105 via the related reed switches. Thus, if the forward drive reed switch 90 is closed, the forward branch line 103 will be energized until such time as the mechanism shifts to the forward drive position at which time the cam-operated switch 99 will open. During this period, the reverse drive switch 100 has, of course, been closed such that, if desired, the engine can be shifted to reverse, similar to that previously described.

In the illustrated embodiment of the invention, an electronic neutral position control is provided including the cam-operated neutral switch 98 which is interconnected into the circuit to selectively bypass the reed switches 90 and 91 and drive the circuit to neutral.

Thus, the cam-operated switch is a normally closed switch and is opened only in the neutral position.

In the circuit of FIG. 7, the neutral switch 98 is connected to selectively apply a bias supply to a pair of cascaded control transistors 106 and 107, the output of which is connected to bypass the reed switches 90 and 91, as presently described.

The switch 98 is connected in series with a pair of resistors 108 and 109, a diode 110 and a second pair of series-connected voltage-dividing resistors 111 and 112 to the common return line or ground 105. The diode 110 is preferably a double-diode pellet such as that commonly identified as a stabistor or other similar device establishing a suitable reference potential which, in the hold-off position, will more positively insure turn-off of the transistors 106 and 107. The base of transistor 106 is connected to the junction of the diode 110 and the resistor 111. The collector of the transistor 106 is connected in series with the resistor 113 to the junction of the resistors 108 and 109. The emitter of the transistor 106 is connected to the base of the transistor 107 and directly to the junction of the resistor 111 and 112. Thus, with the neutral switch 98 closed, voltage is applied across the base-to-emitter circuit in accordance with the relative resistance of the resistor 111. This would drive the transistor 106 to conduct. The transistor 107, as noted, has its base connected to the emitter of the transistor 106 and to the junction of the resistors 111 and 112. The emitter of transistor 107 is connected directly to the reference or ground line 105 and thus the base-to-emitter junction is connected across the resistor 112. When the neutral cam-operated switch 98 is closed, a voltage is also developed across the resistor 112 tending to turn on the transistor 107. The collector of the transistor 107 is connected to the ungrounded side of the reed switches 90 and 91 through related diodes 114 and 115, which are polarized to conduct from the branch lines 103 and 104 to the collector. Thus, the one diode 114 has its anode connected to the one reed switch 90 and has its cathode connected to the collector of transistor 107. The second diode 115 similarly has its anode connected to the reed switch 91 and its cathode connected to the collector in common with the cathode of the first diode 114. When the transistor 107 conducts. it provides an effective ground connection ot the top side of the reed switches 90 and 91 relative to the related relay windings 96 and 96, the forward drive cam switch 99 and the reverse drive cam switch 100. Thus, if the reed switches 90 and 91 are both open, but with the gear mechanism in other than neutral, the cam-operated neutral switch 98 is closed. One of the other switches 99 and 100, either the forward drive or the reverse drive switch, will also be closed. Thus, assume the forward drive switch 99 is closed, the motor 34 having previously been in the reverse drive position. The neutral lock circuit will result in energization of the forward drive winding 99 to shift the gear mechanism from the reverse position to neutral, as follows.

The closed neutral switch 98 provides a turn-on bias to the transistors 106 and 107. This effectively grounds the junction of the diodes 114 and 115. As a result, power is supplied from the positive side of the battery through the now closed forward drive switch 99, the relay winding 96, the diode 14, transistor 107 to ground. The motor 34 drives the gear and clutch mechanism to the neutral position. In the neutral position, the cam-operated neutral switch 98 opens, thereby opening the circuit to the transistors 106 and 107 which turn off and terminate operation of the drive circuit. This insures that the apparatus and motor 34 will always be returned to the neutral position.

In order to cut out the neutral establishing circuit during the normal operation of the system, the input to the transistor 106 is selectively grounded through closure of reed switches 90 and 91, as follows. The junction of the resistor 109 and diode 110 is connected via a turn-off line to the junction of a pair of diodes 116 and 117 which, in turn, have their cathode sides connected respectively to the branch circuit 103 of the forward driving relay winding 96 and the branch circuit 104 of the reverse driving relay winding 97. Thus, the diode 116 has its cathode connected the the branch line 103 and its anode connected to the turn-off line. Similarly, the anode 117 is connected in common to the turn-off line and the cathode is connected to the branch 104. With either reed switch 90 or 91 closed, the corresponding diode cathode is effectively connected to ground. If the neutral switch 98 is also closed, current flows through the resistors 108 and 109 and then via the turn-off line through the diodes 116 or 117 directly to ground. As a result, the anode of the diode 110 is effectively grounded and current is shunted from the base of the transistor 106. Consequently, neither the transistor 106 or the transistor 107 will turn on, and the circuit will operate under the control of the reed switches 90 or 91.

Under normal shift selection conditions, the circuit may continue to draw current through this bypass network. The cascaded transistors 106 and 107 permit operation of the first transistor 106 with a very small input signal, while minimizing of the consuming of battery energy.

In the illustrated embodiment of the invention, transient protection capacitors 118 may also be connected between the three branch lines and ground, as shown in FIG. 7, for optimum safety or quality of operation.

The neutral lockout circuit condition will not permit erroneous operation of the engine as the closed reed switch 90 or 91 is necessarily in series with the open cam-operated switch. If the cam-operated switch is not open, the corresponding relay will be energized to, in turn, energize the motor 34 and drive the gear mechanism towards the corresponding position and through the neutral position as a result of the continued energization of the circuit through the neutral circuit previously described, until the opposite cam-operated switch opens. Thus, with either of the reed switches 90 or 91 closed, the diodes 114 and 115 will not conduct until such time as that circuit has been open at the positive supply.

The switches 98, 99 and 100 are actuated by properly shaped cams 120, 121 and 122 which are coupled to and rotated in synchronism to the clutch cam 38, as in the previous embodiment. Further, a starter control switch 123 is connected in the circuit to the motor starter 124. A cam 125 is coupled to the other cams and is configured to close switch 123 only with the clutch control in the neutral position. The engine can then only be started with the apparatus in the neutral position.

Figure 9:
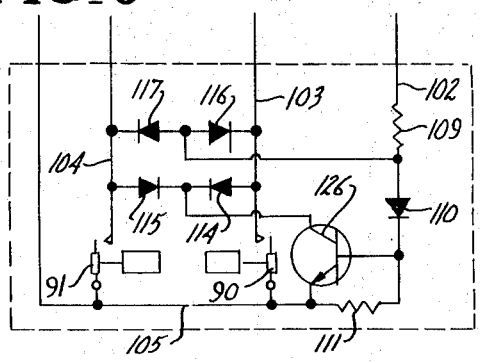
FIG. 9 is a schematic circuit showing a modification of the circuit of FIG. 7.

Although the illustrated circuit provides a highly desirable interaction and insures driving of the circuit to neutral, the circuit may be simplified with a consequent reduction in cost by employing a single-stage, high-gain amplifying circuit such as shown in FIG. 9. The corresponding elements in the two embodiments are correspondingly numbered for simplicity and clarity of explanation.

In particular, the two-stage transistors 106 and 107 are replaced by a single high-gain, single-stage transistor 126 having its collector-to-emitter circuit connected between the junction of the diodes 114 and 115 in the common return or ground line. The base of the transistor 126 is directly to the neutral control branch 102 and in particular the junction of the diode 110 and a resistor 111. The junction of the resistor 109 and the diode 110 is again connected to the junction of the diodes 116 and 117. This circuit then operates to turn off the neutral operating transistor 126 in the same manner as previously described with either switch 90 or switch 91 closed.

With the revision to the circuit, the circuit operates basically in the same manner as previously described with the two-stage transistor amplifying circuitry. In this case, however, the total resistance of resistors 108 and 109 is substantially less than the previously described resistance of resistor 109. Consequently, in the turn-off position, a relatively heavy current may be drawn through the turn-off circuit if the shift mechanism has been positioned to hold one of the reed switches 90 or 91 closed. As a result, this will tend to establish a heavy battery drain. This, however, is not considered particularly undesirable as the system should be constructed to impress upon and insure that the operator will take pains to place the switch circuit in neutral with the reed switches 90 and 91 open. If this is not done, the circuit will normally be such as to cause excessive rusting of the clutch mechanism and the like and thereby provide greater damage than that associated with battery drain.

Further, in an actual construction, the system may include the small electronic switch assembly mounted at the front of the boat or some other convenient location with the other components forming the power actuator located adjacent the drive assembly in the rear of the boat. A wire cable, not shown, including the three branch lines 102, 103 and 104, connect the two assemblies.

The present invention thus provides a highly reliable and long life assembly for the controlled energization of a shift motor or the like which is adapted to be moved to either of two selected extremes and an intermediate neutral.

Various modes of carrying out the invention are contemplated as being within the scope of the following claims particularly pointing out and distinctly claiming the subject matter which is regarded as the invention:

I claim:

1. In a reversible drive apparatus having positioning means to selectively establish a forward drive condition, a reverse drive condition and a neutral condition, comprising a prime mover for actuating said positioning means, a power circuit means for energizing said prime mover and including first and second drive circuit means for energizing the prime mover to selectively establish a forward drive condition and a reverse drive condition, a neutral circuit means connected to both said first and second circuit means to actuate the prime mover to establish the neutral condition, each of said first and second circuit means each including a corresponding electrically activated switch means for energizing the prime mover and each includes a disconnect switch means responsive to establishment of the corresponding drive condition to open the corresponding circuit means, said neutral circuit means including a disconnect switch means connected in common to both of the other disconnect switch means through unidirectional conducting means, and means to prevent the simultaneous effective operation of said electrically activated switch means.

2. The reversible drive apparatus of claim 1, having an engine start control means, and means coupling said start control means to the disconnect switch means of the neutral circuit means to permit starting only with the disconnect switch means in a selected position.

3. In a reversible drive apparatus having positioning means to selectively establish a forward drive condition, a reverse drive condition and a neutral condition, comprising a prime mover for actuating said positioning means, a power circuit means for energizing said prime mover and including first and second drive circuit means for energizing the prime mover to selectively establish a forward drive condition and a reverse drive condition, said first and second drive circuit means including a selection switching means, said selection switching means including a first drive switch in said first circuit means and a second drive switch in said second circuit means and having a common control member having a first neutral position opening both said first and second switches and a second position closing said first switch and a third position closing said second switch, a neutral circuit means including a neutral drive branch circuit connected to both said first and second drive circuit means and in circuit with said selection switching means to actuate the prime mover to establish the neutral condition in response to selected opening of said drive circuit means in the presence of the said forward or reverse drive conditions, said neutral drive branch circuit further including a neutral switch means operated with said neutral position to open said neutral drive branch circuit upon establishment of the neutral position and a control electronic switch actuated through said neutral switch means and connected to said first and second drive circuit means and by oppositely polarized diodes to selectively conduct and by-pass said first and second switches, said neutral circuit means including a disable branch circuit connected to said first and second circuit means and in circuit with said selection switching means and responsive to actuation of said first and second drive circuit means to disable said neutral drive branch circuit.

4. The reversible drive apparatus of claim 3, wherein said disable branch circuit includes second oppositely polarized diode means connected between said first and second circuit means and to the input of said electronic switch means to selectively disconnect said electronic switch means in response to closure of one of said drive switches.

5. The reversible drive apparatus of claim 4, wherein said prime mover is a motor means, and having motor driven switches including a forward drive switch and a reverse drive switch and a neutral drive switch coupled to said motor means and connected in said corresponding circuit means to selectively disconnect the corresponding circuit means in response to movement of said drive apparatus to the corresponding drive condition, said first and second diode means are connected between said first and second drive circuit means and between said drive switches of said selection switching means and said motor driven switches in each of said first and second drive circuit means, said electronic switch including a transistor means having the input bias means connected to the motor driven neutral switch and to the second diode means and having an output means collector connected between the first diode means and the opposite side of the selection switches.

6. The reversible drive apparatus of claim 4, including a start control switch coupled to said motor means and closed in response to positions of said other switches to a neutral condition.

7. In a reversible drive apparatus having positioning means to selectively establish a forward drive condition, a reverse drive condition and a neutral condition, comprising a prime mover for actuating said positioning means, a power circuit means for energizing said prime mover and including first and second drive circuit means for energizing the prime mover to selectively establish a forward drive condition and a reverse drive condition, said first and second drive circuit means including selection switching means, a neutral circuit means including a neutral drive branch circuit connected to both said first and second drive circuit means and in circuit with said selection switching means to actuate the prime mover to establish the neutral condition in response to selected opening of said drive circuit means in the presence of the said forward or reverse drive conditions, said neutral circuit means including a disable branch circuit connected to said first and second circuit means and in circuit with said selection switching means and responsive to actuation of said selection switching means to disable said neutral drive branch circuit wherein said prime mover is a permanent magnet direct current motor including first, second and third disconnect switch means, said first circuit means including a first relay means having contacts selectively connecting said motor to power, said second circuit means including a second relay means having contacts selectively connecting said motor to power, a selection switch means having forward contact means and a reverse contact means, said first relay means being connected in an energizing circuit including the first disconnect switch means and said forward contact means, said second relay means being connected in an energizing circuit including the second disconnect switch means and said reverse contact means, said neutral circuit means including the third disconnect switch means connected to said contact means and in series with diode means to establish a circuit path from said third disconnect switch means by-passing said contact means to establish an alternate energizing path to said relay means, and sensing means connected to said contact means to deactivate said neutral circuit means in response to actuation of either of said first or second contact means.

8. The reversible drive apparatus of claim 7, having cam means driven by said motor and coupled to actuate said disconnect switches, and having a shift means and a clutch means, means operated by said motor to sequentially actuate said shift means and said clutch means to actuate the shift means when said clutch means operatively disconnects the drive apparatus, said neutral circuit means including a transistor having an output circuit and an input circuit, said diode means includes a pair of oppositely polarlized and series connected diodes connected between said first and second relay means and having a common junction, said output circuit being connected to the common junction of said diodes and to a corresponding side of said selection contact means to by-pass both said forward and reverse contact means, said sensing means including a second pair of oppositely polarized and series connected diodes connected between said first and second relay means in parallel with said first pair of diode means, the corresponding diodes of the first and second pairs of diode means being oppositely polarized, and said input circuit being connected to the common junction of the second pair of diode means to positively hold said transistor off with either of said contact means closed.

9. The reversible drive apparatus of claim 8, wherein said input circuit includes a second transistor having an output circuit connected to the input of the first transistor and an input circuit connected to the second pair of diode means to minimize the current flow with the third disconnect switch closed.

10. In a reversible drive apparatus having positioning means to selectively establish a forward drive condition, a reverse drive condition and a neutral condition, comprising a drive motor for actuating said positioning means, first and second circuit means each includes a relay means having contacts selectively connecting one side of the motor to power and the opposite side to ground and each includes a disconnect switch means coupled to the motor to open the corresponding circuit means, and said neutral circuit means includes a disconnect switch means coupled to the motor, said relay means including first and second relay windings wound oa common magnetic structure including a single armature having an intermediate pivot mount and aligned with said windings to the opposite sides of the pivot mount such that energization of winding pivots said armature to increase the spacing with respect to the opposite winding.

11. The reversible drive apparatus of claim 10, wherein said relay means includes a first common contact to one side of said armature and a second common ground contact aligned with said first common contact and said armature, and individual output contacts aligned with and interspaced with said output contacts and with one power contact to each side of said pivot mount, said power contacts being oppositely moved by said armature.

12. In a reversible drive apparatus having positioning means to selectively establish a forward drive condition, a reverse drive condition and a neutral condition, comprising a prime mover for actuating said positioning means, a power circuit means for energizing said prime mover and including first and second drive circuit means for energizing the prime mover to selectively establish a forward drive condition and a reverse drive condition, a neutral circuit means connected to both said first and second circuit means to actuate the prime mover to establish the neutral conditon, having a selection switch means having forward path contacts and reverse path contacts, said first circuit means including a disconnect switch means connected between the forward path contacts of said selection switch and the first side of said motor, said second circuit means including a disconnect switch means connected between the reverse path contacts of said selection switch and the second side of said motor, said neutral circuit means including a disconnect switch means connected to said selection switch means and in series with diode means to the connection between the other disconnect switch means to establish a circuit path from said neutral circuit means with the first and second circuit means isolated through said diode means.

13. The reversible drive apparatus of claim 12, having cam means driven by said motor and coupled to actuate said disconnect switch means, and having a shift means and a clutch means, and means operated by said motor to sequentially actuate said shift means and said clutch means to actuate the shift means when said clutch means operatively disconnect the drive apparatus.

14. In a reversible drive apparatus having positioning means to selectively establish a forward drive condition, a reverse drive condition and a neutral condition, comprising a prime mover for actuating said positioning means, a power circuit means for energizing said prime mover and including first and second drive circuit means for energizing the prime mover to selectively establish a forward drive condition and a reverse drive condition, a neutral circuit means connected to both said first and second circuit means to actuate the prime mover to establish the neutral condition, wherein said prime mover is a permanent magnet direct current motor, said first circuit means including a relay having contacts selectively connecting a first side of said motor to ground and to power, said second circuit means including a relay having contacts selectively connecting the second side of said motor to ground and to power, said relays establishing the ground connection when not energized, a selection switch means having a forward path position and a reverse path position and a neutral path position, said first relay being connected in an energizing circuit including a disconnect switch means connected between said selection switch and the first side of said motor, said second relay being connected in an energizing circuit including a disconnect switch means connected between said selection switch and the second side of said motor, said neutral circuit means including a disconnect switch means connected to said selection switch means and in series with diode means to the connection between the other disconnect switch means to establish a circuit path from said neutral circuit means with the first and second circuit means isolated through said diode means.

15. The reversible drive apparatus of claim 14, having cam means driven by said motor and coupled to actuate said disconnect switch means, and having a shift means and a clutch means, and means operated by said motor to sequentially actuate said shift means and said clutch means to actuate the shift means when said clutch means operatively disconnect the drive apparatus.

* * * * *

UNITED STATES PATENT OFFICE
CERTIFICATE OF CORRECTION

Patent No. 3,789,688      Dated February 5, 1974

Inventor(s) FLOYD M. MINKS

It is certified that error appears in the above-identified patent and that said Letters Patent are hereby corrected as shown below:

[73] Interest: Application filed under Rule 47

| | | | |
|---|---|---|---|
| Column | 2, | Line | 56, | after "separate" delete "in"; |
| Column | 3, | Line | 66, | before "FIG." delete "c8"; |
| Column | 4, | Line | 2, | after "EMBODIMENT" delete "20"; |
| Column | 5, | Line | 26, | before "cable" delete "shaft" and insert --- shift ---; |
| | | Line | 51, | before "portion" delete "On" and insert --- One ---; |
| Column | 11, | Line | 56, | before the comma (,) and after "and" cancel "96" and insert --- 97 ---; |
| Column | 12, | Line | 6, | after "diode" delete "14" and insert --- 114 ---; |
| Column | 13, | Line | 19, | before "directly" insert --- connected ---; |
| Column | 16, | Line | 44, | before "common" delete "oa" and insert --- on a ---. |

Signed and sealed this 1st day of October 1974.

(SEAL)
Attest:

McCOY M. GIBSON JR.
Attesting Officer

C. MARSHALL DANN
Commissioner of Patents